United States Patent [19]
Gorog et al.

[11] Patent Number: 5,729,092
[45] Date of Patent: Mar. 17, 1998

[54] CRT FOCUS MASK DEGAUSSING ARRANGEMENT RESPONSIVE TO A BREAKDOWN EVENT

[75] Inventors: Istvan Gorog, Lancaster, Pa.; Roger Pieri, Dijon, France; John Alan Holtzapple, Leola, Pa.; Richard William Nosker, Princeton, N.J.; Paul Kuczer, Fallsington, Pa.

[73] Assignee: Thomson Consumer Electronics, Inc., Indianapolis, Ind.

[21] Appl. No.: 704,003

[22] Filed: Aug. 22, 1996

[51] Int. Cl.$^6$ .................................................. H01J 29/07
[52] U.S. Cl. ................... 315/8; 361/150; 313/402
[58] Field of Search ................... 315/8; 361/150; 313/402

[56] References Cited

U.S. PATENT DOCUMENTS

| | | | |
|---|---|---|---|
| 4,445,072 | 4/1984 | Fredres | 315/8 |
| 4,458,178 | 7/1984 | Tenney et al. | 315/8 |
| 4,514,658 | 4/1985 | Bloom | 313/402 |
| 4,535,270 | 8/1985 | Frantz et al. | 315/8 |
| 4,636,911 | 1/1987 | Truskalo | 361/150 |
| 4,829,214 | 5/1989 | Lendaro | 315/8 |
| 5,475,283 | 12/1995 | Yoshida | 315/8 |
| 5,499,156 | 3/1996 | Bentley | 361/150 |

FOREIGN PATENT DOCUMENTS

| | | |
|---|---|---|
| 63-316589 | 12/1988 | Japan . |
| 2-305091 | 12/1990 | Japan . |

OTHER PUBLICATIONS

U.S. Patent Application No. 08/701,610 entitled Breakdown Event Detector, filed on Aug. 22, 1996, in the names of Kuczer et al., attorney docket number RCA 87,969Z.

Primary Examiner—Robert Pascal
Assistant Examiner—Justin P. Bettendorf
Attorney, Agent, or Firm—Joseph S. Tripoli; Joseph J. Laks; Marion P. Metelski

[57] ABSTRACT

A cathode ray tube may utilize a focus mask color-selection structure. The focus mask structure is susceptible to localized, transient short circuit events, or breakdown events. These events may be caused by conductive particulates that become free within the cathode ray tube and provide a short circuit between first and second layers of the focus mask. The breakdown events are undesirable because they may result in cross-strand currents causing mask strand magnetization that can interfere with a video image on the screen of the cathode ray tube. A rapid degaussing operation is initiated during the next subsequent vertical blanking period following detection of the breakdown event.

19 Claims, 8 Drawing Sheets

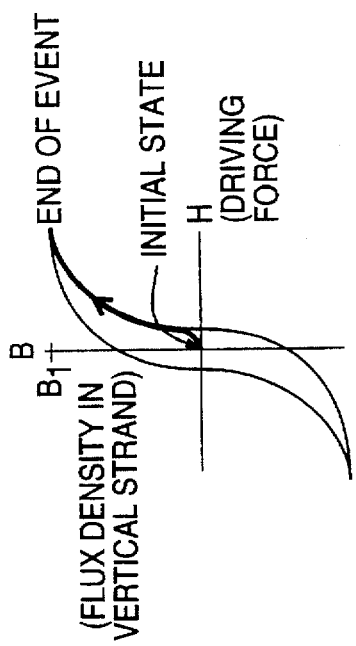
FIG. 3a AK STEEL
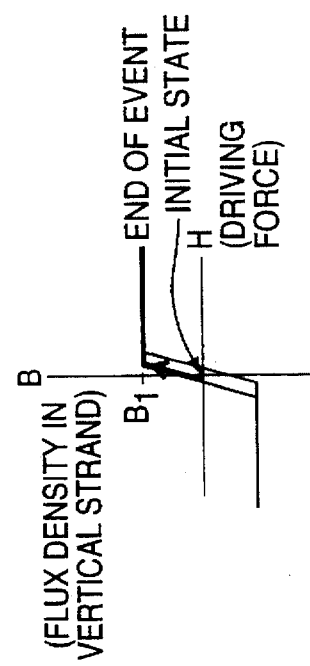
FIG. 3b PERMALLOY
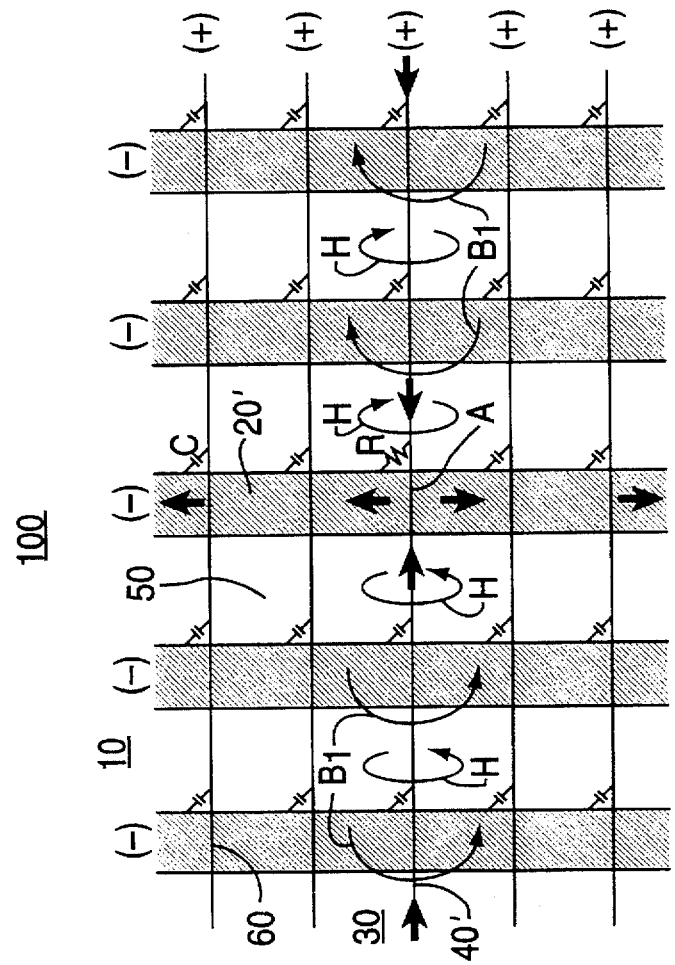
FIG. 2

CRT FOCUS MASK DEGAUSSING ARRANGEMENT RESPONSIVE TO A BREAKDOWN EVENT

BACKGROUND OF THE INVENTION

1. Field of the Invention

This invention relates generally to the field of focus-mask type cathode ray tubes, and, in particular, to eliminating discoloration bands that may be associated with such focus-mask type cathode ray tubes.

2. Description of Prior Art

In a video display apparatus, such as a television receiver or a computer or video display terminal, a cathode ray tube (CRT) includes an evacuated envelope usually made of high-strength glass. The envelope includes a generally flat or slightly curved faceplate together with a funnel-shaped bell and extending neck. The interior side of the faceplate supports a phosphor screen.

In a color CRT, a plurality of electron guns are used together with a phosphor screen which supports plural areas of phosphors having differing color light-emitting characteristics. When an electron beam strikes the phosphor screen, visible light is emitted therefrom. A color-selection structure is interposed between the electron guns and the phosphor screen to cause each of the electron guns to strike only an associated type of colored light-emitting phosphor.

One such structure is a shadow mask. A shadow mask is a thin sheet of steel having a plurality of apertures through which electrons must pass on their way to striking the phosphor screen. The shadow mask functions as a filter in that only those electrons incident to the shadow mask at the appropriate angle will pass through its apertures and strike the phosphor screen at the appropriate location.

One disadvantage of the shadow mask is that it is only approximately 20% transmissive, meaning simply that only approximately 20% of the electrons emitted by the CRT's electron guns eventually pass through the shadow mask's apertures and strike the phosphor screen. The remaining electrons will be absorbed by the shadow mask, where their energy will be dissipated as heat. A shadow mask has a maximum theoretical transmissivity of approximately 33% and a typical transmissivity that is equal to approximately 18%.

Several techniques are known to the art for increasing the transmissivity of a color-selection structure while still ensuring that the electrons passing through the color-selection structure excite only an associated type of colored light-emitting phosphor on the screen. One such technique employs a two-layer focus-mask color-selection structure to define a quadrupole electrostatic lens in each of the apertures of the color-selection structure. Each quadrupole lens focuses the electron beamlets passing through that quadrupole lens in one transverse direction and defocuses them in the orthogonal transverse direction on the target according to the relative magnitudes and polarities of the electrostatic fields comprising the quadrupole lens. The use of a focus mask structure permits an electron transmissivity in excess of approximately 60%, and focus mask structures have a maximum theoretical transmissivity that approaches unity.

Focus mask CRTs have been successfully constructed, but a critical operational defect has been noted. Specifically, experimental focus mask CRTs have been found to develop anomalies, which are best described as discoloration bands, that extend horizontally across the screen. These discoloration bands can occur quite frequently and can significantly impair the utility of CRTs employing focus-mask type color selection means.

SUMMARY OF THE INVENTION

In a first aspect of an inventive arrangement described herein, such discoloration bands have been determined to be the result of beam landing errors, or misregistration, that are caused by remnant magnetization in the focus mask structure.

In a second aspect of an inventive arrangement described herein, the remnant magnetization of the mask structure has been discovered to be due to localized currents, caused by transient short circuits, or breakdown events, between the first and second layers of the focus mask structure. These breakdown events can be precipitated by conductive particulates that are trapped within the CRT.

In a third aspect of an inventive arrangement described herein, a discoloration band correction circuit degausses the focus mask to rapidly eliminate the discoloration band so that the effects of a breakdown event are imperceptible to the viewer of the video display apparatus.

An arrangement for eliminating discoloration bands in a cathode ray tube having a focus mask structure comprises: a breakdown detection circuit for detecting a breakdown event in the focus mask structure; and, a degauss circuit responsive to the breakdown detection circuit for degaussing the focus mask.

The degauss circuit may have a resonant topology. The degaussing may comprise a resonant capacitor, and charging of the capacitor may defer the degaussing following detection of the breakdown event.

A further arrangement for eliminating discoloration bands in a cathode ray tube having a focus mask structure comprises: a breakdown detection circuit for detecting a breakdown event in the focus mask structure; a degauss control circuit coupled to the breakdown detection circuit; and, a degauss circuit responsive to the degauss control circuit for degaussing the focus mask. The breakdown detection circuit may trigger the degauss control circuit upon detection of the breakdown event. The breakdown detection circuit may provide a waveform, which may have a substantially pulse shape, to the degauss control circuit.

The degauss control circuit may defer degaussing until a next subsequently occurring blanking of a screen of the cathode ray tube following detection of the breakdown event. The blanking may be responsive to a vertical blanking pulse of a video signal applied to the cathode ray tube.

The degauss control circuit may comprise: means for storing information indicating the occurrence of a breakdown event; means for coupling a blanking pulse to the arrangement; means for comparing the information from the storing means with the blanking pulse; and, triggering means responsive to the comparing means. The triggering means may comprise a monostable multivibrator circuit, which may be configured for a non-retriggerable mode of operation. The comparing means may enable degaussing during a next subsequently occurring blanking pulse, which may be a vertical blanking pulse, following detection of the breakdown event.

An even further arrangement for eliminating discoloration bands in a cathode ray tube having a focus mask structure comprises: means for storing information indicating the occurrence of a breakdown event; means for coupling a blanking pulse to the arrangement; first means for comparing the information from the storing means with the blanking pulse; triggering means responsive to the comparing means; means for generating a pulse waveform responsive to the first means; second means for comparing the information from the storing means with the pulse waveform; and, a degaussing circuit responsive to the triggering means for degaussing the focus mask structure.

The second means may defer degaussing of the focus mask during a duration of the pulse waveform. The generating means may comprise a monostable multivibrator circuit, which may be configured for a non-retriggerable mode of operation.

The above, and other features and advantages of the present invention will become apparent from the following description read in conjunction with the accompanying drawings, in which like reference numerals designate the same elements.

BRIEF DESCRIPTION OF THE DRAWINGS

FIGS. 2, 3a, 3b, 4a, 4b, and 5 are useful for explaining breakdown events in focus mask color-selection structures.

DETAILED DESCRIPTION OF THE PREFERRED EMBODIMENTS

Figure 1:
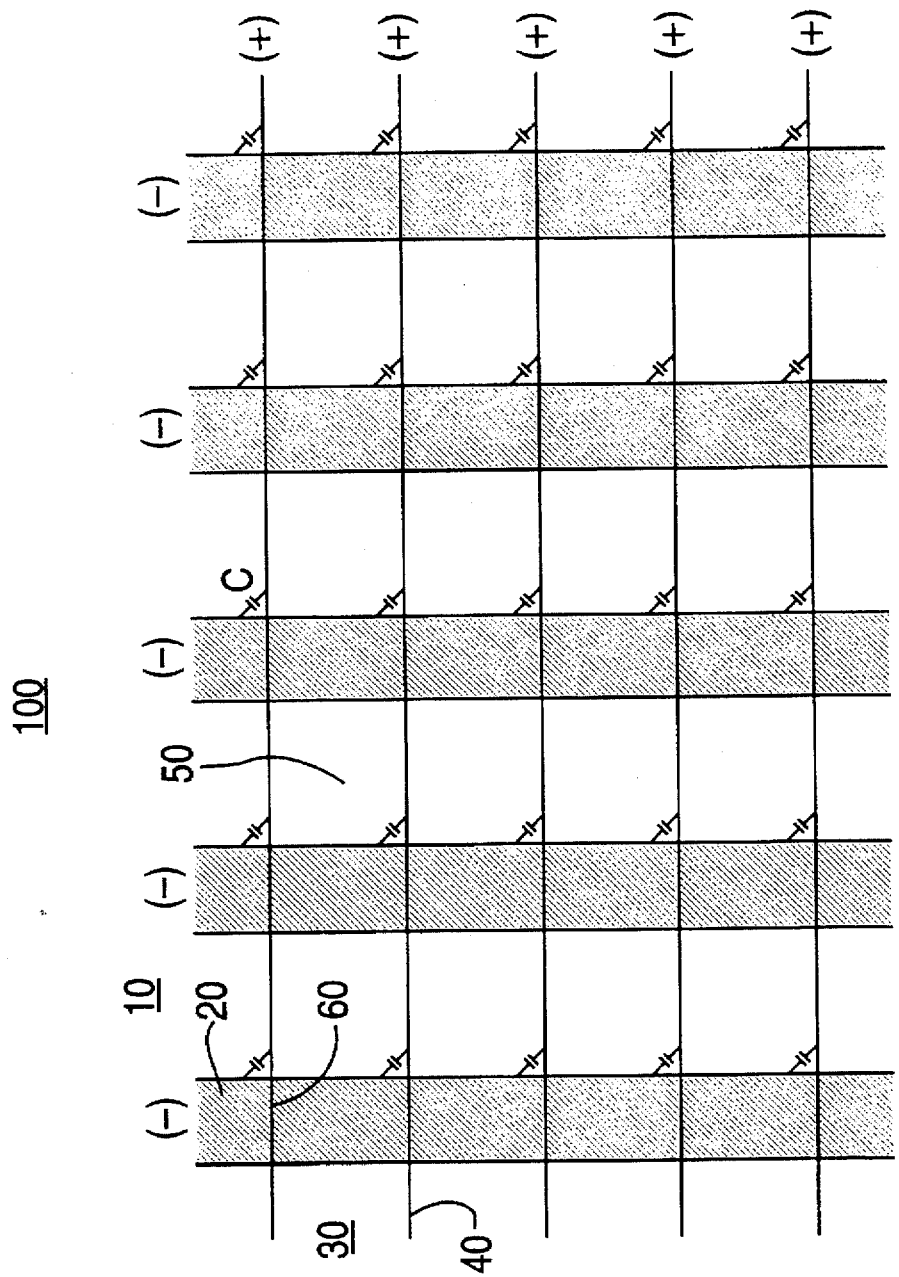
FIG. 1 depicts a conventional focus-mask type color-selection structure.

An exemplary focus-mask structure 100 is represented in FIG. 1. The focus mask may comprise a first layer 10 of vertically-oriented metallic strands 20, each of which may, illustratively, have a width of approximately 10 mils and a thickness of approximately 2 mils. These strands may be comprised of a ferromagnetic material, such as annealed AK steel or permalloy. The exemplary focus mask structure may further comprise a second layer 30 of horizontally-oriented metallic wires 40, each of which may, illustratively, have a diameter of approximately 1 mil. The conductors in each of the two layers may be tied together at each end by busbars (not shown). The capacitors C represent the inherent capacitance between the two layers of the focus-mask structure. The vertical strands 30 and horizontal wires 40 are arranged to provide rectangular mask apertures 50 having, for example, a horizontal dimension of approximately 20 mils and a vertical dimension of approximately 15 mils.

Quadrupolar focusing action is achieved by biasing the vertical and horizontal conductors 20 and 40 with respect to each other, typically in the range from several hundred to over 1000 V DC. For example, to focus the electron beam in the horizontal direction in order to direct the transmitted electrons onto vertical phosphor stripes, the horizontal wires 40 must have a positive polarity with respect to the vertical strands 20, as indicated in FIG. 1. The bias voltage for a particular CRT geometry depends upon the ultor voltage, which is typically in the range of 20 kV to 30 kV. A suitable focus mask arrangement connects the vertical strands 20 to the ultor and applies an additional positive bias to the horizontal wires 40.

The vertical strands 20 and horizontal wires 40 may be separated by a vacuum-compatible electrical insulator 60, for example a glass frit, which may have a thickness of approximately 3 mils. It is advantageous to arrange the insulator 60 so that it is invisible to the incident electron beams, so that insulator charging effects that may interfere with the proper operation of the quadrupole lenses can thus be avoided.

Exploration of the nature of the discoloration bands has resulted in the critical insight that these bands occur because of misregistration caused by remnant magnetization of the focus-mask structure. Furthermore, it has been discovered that localized, transient short circuit events, or breakdown events, are the significant source of the remnant magnetization.

Such a breakdown event may, for example, be caused by contaminants contained within the CRT. It is well-known that commercially mass-produced CRTs regularly show some level of contamination, which typically takes the form of conductive particulates, for example flakes of aluminum or particles of graphite or iron. The examination of the discoloration band anomaly makes clear that these conductive particulates within the CRT play a significant part in creating the breakdown events that lead to the discoloration bands.

On the basis of empirical research, it is currently estimated that well-constructed focus-mask type CRTs may experience a breakdown event of the type described herein anywhere in the range from once every few minutes to once every few hundred hours. Mechanical vibrations, for example during transportation, are likely to dislodge loose particles and thus increase the likelihood of breakdown events in the focus-mask structure. Furthermore, electrostatic forces produced during normal operation of the CRT may also dislodge loosely adhering particles. Thus, during the expected lifetime of a CRT, breakdown events leading to discoloration bands can reasonably be anticipated.

The nexus between the breakdown events and the discoloration bands can be understood with reference to FIGS. 2–5. Referring to FIG. 2, a breakdown event is postulated to occur at point A, where, illustratively, a conductive particulate shorts horizontal wire 40' and vertical strand 20'. The short circuit that defines the breakdown event is represented by a resistance R, the use of which indicates that the conductive particulate that causes the breakdown event does have some finite, albeit small, resistance associated with it.

A cross-strand current, which may be equal to approximately 4 A, flows through an affected horizontal wire 40' and through resistance R into an affected vertical strand 20'. The cross-strand current ceases flowing after approximately several microseconds, most probably because of the destruction of the conductive particulate due to ohmic heating. Also, the impedance of the bias circuit for the first and second layers 10 and 30 is sufficiently high to prohibit several amperes of current through it, so that the principal source of the cross-strand current is the energy stored in the mask capacitance. Once this energy is dissipated, the cross-strand current must drop. The temperature of the focus mask 100 does not rise significantly during a breakdown event.

The flow of the cross-strand current generates a magnetic field H surrounding horizontal wire 40'. The intensity of the magnetic fields H is equal to approximately 3000 A/m at those points of vertical strands 20 nearest the horizontal wire 40'. The intensity of magnetic field H at a particular point near the conducting horizontal wire 40' is inversely proportional to the radial distance from the particular point to a nearest point of horizontal wire 40'.

The magnetic field H induces a flux density $B_1$ in the vertical strands 20, as will be appreciated from an inspection of FIG. 3. FIG. 3(a) shows a B-H curve for a presently preferred ferromagnetic material, in this case annealed AK steel, that may be used to form vertical strands 20. FIG. 3(b) shows a similar curve for a permalloy material. The strands 20 on either side of strand 20' have magnetic fields that are oppositely oriented with respect to each other, as indicated in FIG. 2.

Returning to the annealed AK steel of FIG. 3(a), the flux density $B_1$ induced in the strands 20 by the cross-strand current is in the range from approximately 10,000 gauss to approximately 20,000 gauss within a distance of approximately 150 mils above and below point A.

Figure 4A:
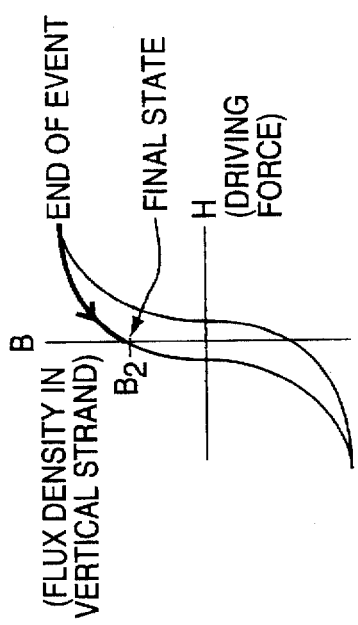
Figure 4B:
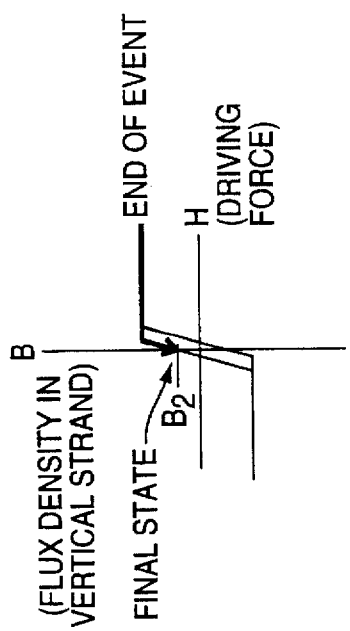
Figure 5:
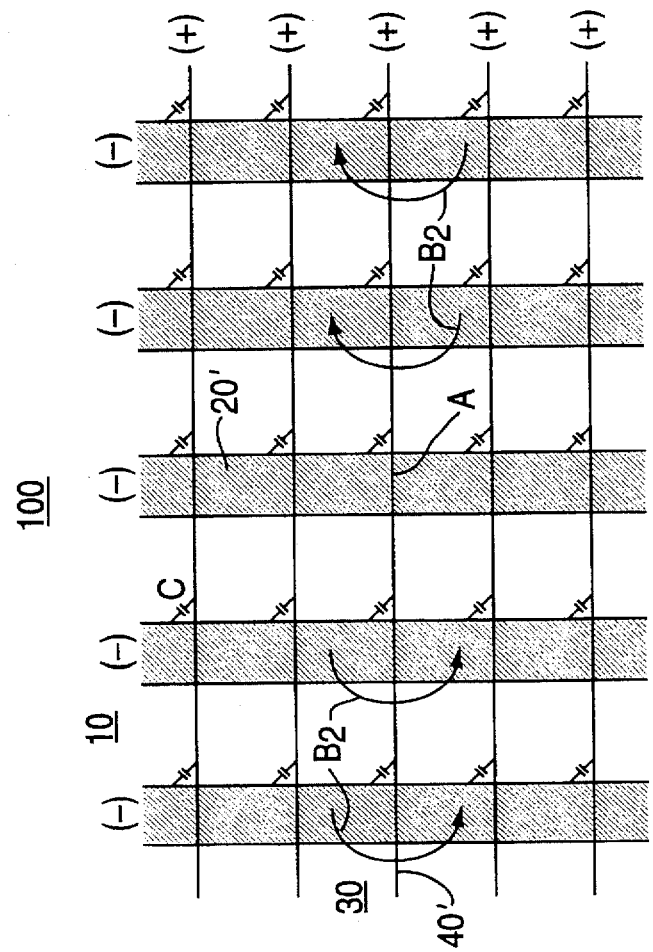

Once the cross-strand current terminates, approximately one-half of the flux density $B_1$ is retained within these saturated regions of vertical strands 20, as indicated by FIG. 4(a) for annealed AK steel and FIG. 4(b) for permalloy. The vertical strands 20, thus magnetized, are now effectively bar magnets, and a magnetic flux density $B_2$ emanates from the vertical strands 20 and into the surrounding vacuum, as shown in FIG. 5. The flux density $B_2$ has a magnitude of approximately 50 gauss within a distance of approximately 10 mils from the horizontal wire 40'; this magnitude may drop off to approximately 3 gauss at a distance of approximately 150 mils. In a focus-mask type CRT illustratively having a Q-space equal to approximately 675 mils, a flux density distribution of this type may, illustratively, result in a maximum misregister, or beam landing error, of approximately 60 micrometers.

An obvious solution to the elimination of the discoloration bands is to eliminate the contaminants. However, while good manufacturing practices can significantly reduce the number of contaminants, it is well known that commercially mass-produced CRTs regularly show some level of contamination. Thus, it would significantly, and perhaps prohibitively, increase the cost of manufacturing focus-mask type CRTs if contaminant-free conditions became necessary for the manufacturing process.

Figure 6:
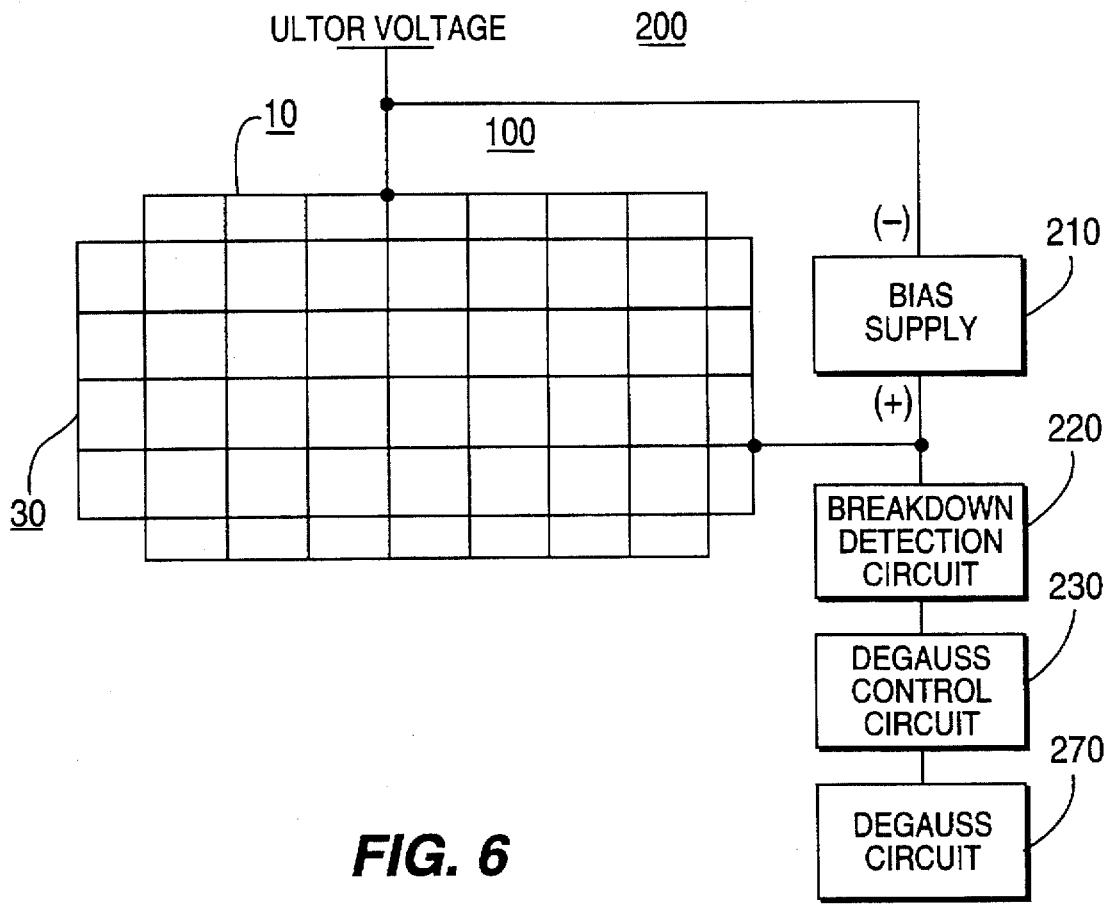
FIG. 6 shows, in block form, a discoloration band correction system according to an inventive arrangement described herein.

A better solution, in the form of a discoloration band correction system 200, is illustrated in block form in FIG. 6. The first layer 10 of focus mask 100 is coupled to an ultor voltage, which may have a value between approximately 20 kV and approximately 30 kV. The second layer 30 is coupled to a bias supply 210, which biases second layer 30 positively with respect to first layer 10. Bias supply 210 may be of a conventional design, but it should preferably be strong enough to rapidly restore an appropriate bias voltage between first and second layers 10 and 30, respectively, if a breakdown event should occur.

A breakdown detection circuit 220 rapidly senses breakdown events in the focus mask 100 by sensing sudden changes in an operating point of bias supply 210. For example, the breakdown detection circuit 220 can be configured to sense a sudden decrease in voltage supplied by bias supply 210 or a sudden increase in current drawn from bias supply 210. Once a breakdown event is detected, a degauss control circuit 230 initiates degaussing of focus mask 100 by degauss circuit 270.

Figure 7:
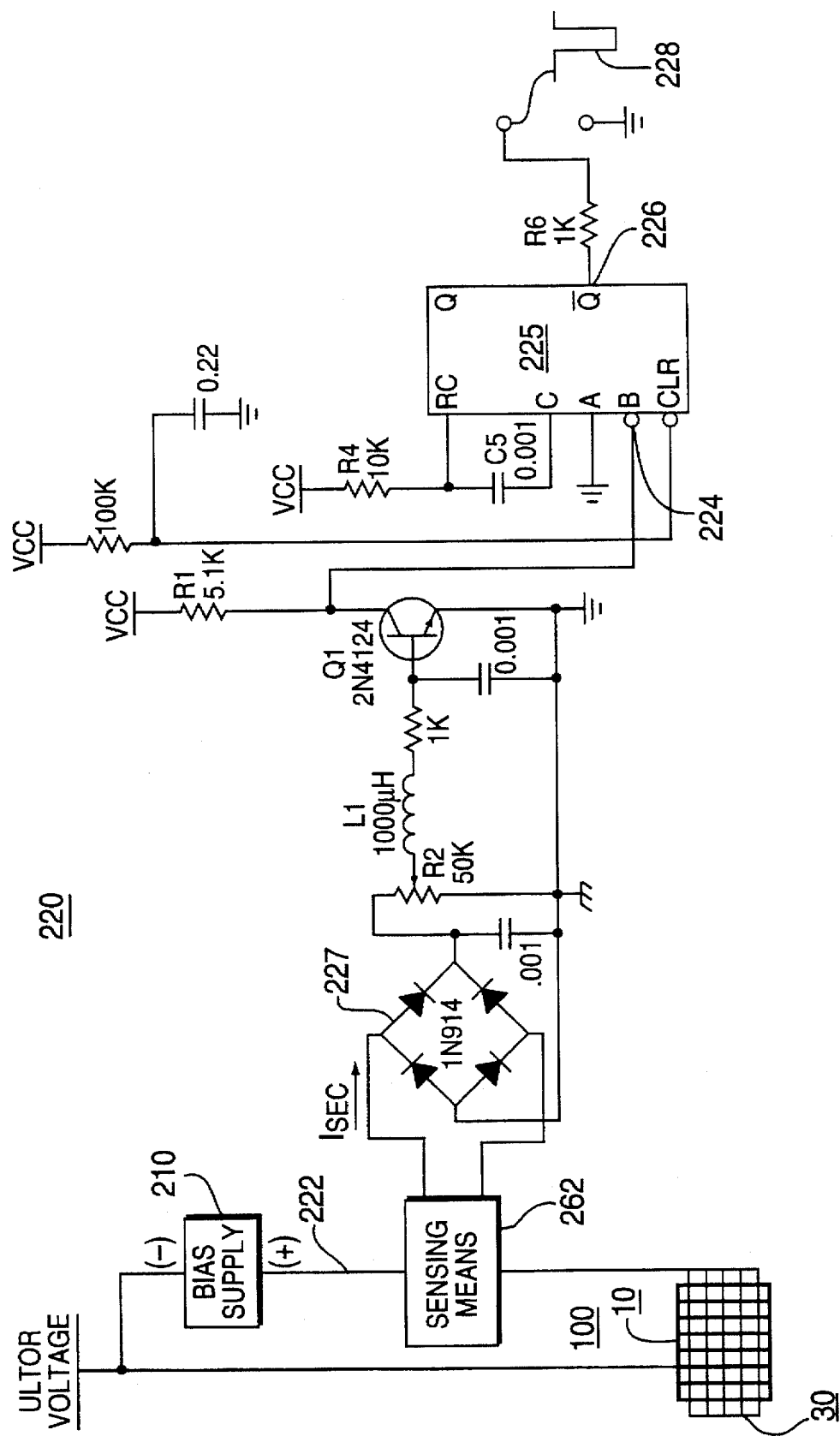
FIGS. 7, 7a, 7b, 7c, and 8 show schematic representations of the component blocks of FIG. 6.

A schematic representation of a presently preferred embodiment of breakdown detection circuit 220 is shown in FIG. 7. A sensing means 262 is coupled in series with bias supply 210 and is also coupled to full-wave rectifier 227. In addition to performing a sensing function, sensing means 262 also beneficially provides electrical isolation between the high-voltage ultor and the lower-voltage detection circuit 220.

Figure 7A:
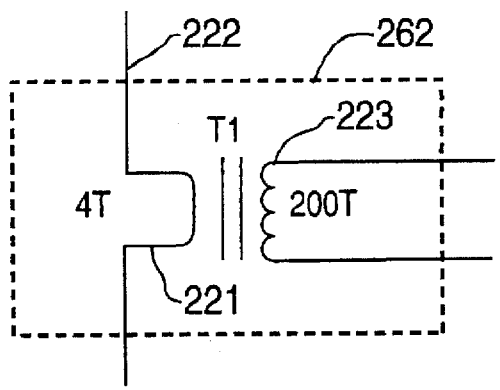
Figure 7B:
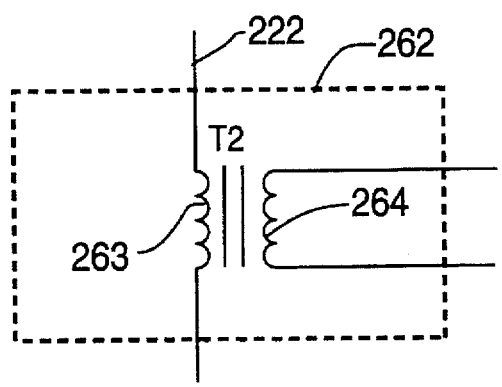
Figure 7C:
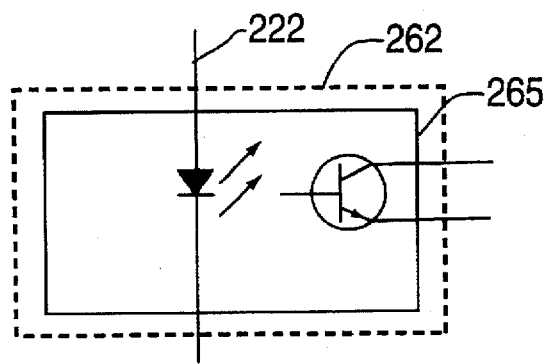

The sensing means 262 may be implemented in several ways, some of which are illustrated in FIGS. 7a–7c. In the presently preferred embodiment of breakdown detector 220, the sensing means is a current transformer T1, as shown in FIG. 7a. A primary winding 221 having approximately four turns is formed from the high-voltage wire 222 used in biasing second layer 30 of focus mask 100. This type of wire may typically be used with voltages of up to approximately 35 kV. A secondary winding 223 may have, illustratively, 200 turns of 24 AWG wire. The number of primary and secondary turns of transformer T1, and hence its turns ratio, may be varied by one skilled in the art according to the requirements imposed upon transformer T1 by a particular embodiment of breakdown detection circuit 220.

Sensing means 262 may alternatively and equivalently be implemented with a voltage transformer T2, shown in FIG. 7b, to identify an inrush of current from bias supply 210 by sensing a random deviation from a nominal voltage between the two layers 10 and 30 of focus mask 100. For instance, when a breakdown event occurs, the output of bias supply 210 becomes shorted and the inrush current is provided by bias supply 210. However, because the output of bias supply 210 is shorted, the output voltage of bias supply 210 suddenly drops, thus indicating the occurrence of the breakdown event.

A primary winding 263 of transformer T2 may be formed from the high-voltage wire 222 used in biasing second layer 30 of focus mask 100. The number of turns of primary and secondary windings 263 and 264, respectively, of transformer T2, and hence its turns ratio, may be varied by one skilled in the art according to the requirements imposed upon transformer T2 by a particular embodiment of breakdown detection circuit 220.

The primary and secondary windings of transformers T1 and T2 may be wound on a toroidal core, for example a toroidal core which may have an industry part number A-438281-2 and may be manufactured by Arnold Engineering Co. The use of a toroidal core in the embodiments shown in FIGS. 7a and 7b is illustrative, and is not intended to suggest that some other core geometry cannot be used.

Referring to FIG. 7c, sensing means 262 may also be implemented using an opto-isolator device 265. It will be apparent to those skilled in the art that the implementations of sensing means 262 shown in FIGS. 7a–7c are merely illustrative, and they are not meant to suggest that other implementations cannot be used within the context of an inventive arrangement described herein.

In routine operation, focus mask 100 is not subject to a breakdown event. Referring to FIG. 7, during such routine operation, transistor Q1 is in a non-conducting, or OFF, state. Resistor R1 couples voltage $V_{CC}$ to a trailing-edge-triggering input 224 of a first monostable multivibrator 225, which may, for example, have an industry part number CD4098B. An inverting output 226 of the multivibrator 225 remains in a logic HIGH state during such routine operation.

When a breakdown event occurs in focus mask 100, the cross-strand current will be supplied by the mask capacitance and by the bias supply 210. As the cross-strand current flows through primary winding 221, a secondary current $I_{SEC}$ is induced at the secondary winding 223. The magnitude of the secondary current $I_{SEC}$ is equal to the product of the magnitude of the cross-strand current and the primary-to-secondary turns ratio of transformer T1.

The secondary current $I_{SEC}$ is rectified by full-wave rectifier 227 and then flows through adjustable resistance R2 and inductor L1 to drive transistor Q1. Resistance R2 is initially adjusted such that breakdown detection circuit 220 can distinguish legitimate breakdown events from normally occurring ripple voltages and currents.

Transistor Q1 thus begins conducting, or turns ON, thereby coupling a reference voltage potential, for example ground, to the trailing-edge-triggered input 224 of multivibrator 225. One skilled in the art will appreciate that other electronic devices, for example an appropriately configured operational amplifier circuit or a comparator circuit, can be used in place of transistor Q1 to provide such coupling.

The transition at input 224, from $V_{CC}$ to ground, triggers the multivibrator 225 to provide a negative-going pulse 228 at inverting input 226. The pulse 228 may have a peak-to-peak value that is equal to approximately the $V_{CC}$ voltage. The pulse width of pulse 228 is set by an appropriate choice of resistor R4 and capacitor C5. In the presently preferred embodiment of breakdown detection circuit 220, pulse 228 has a pulse width equal to approximately 50 microseconds.

Figure 8:
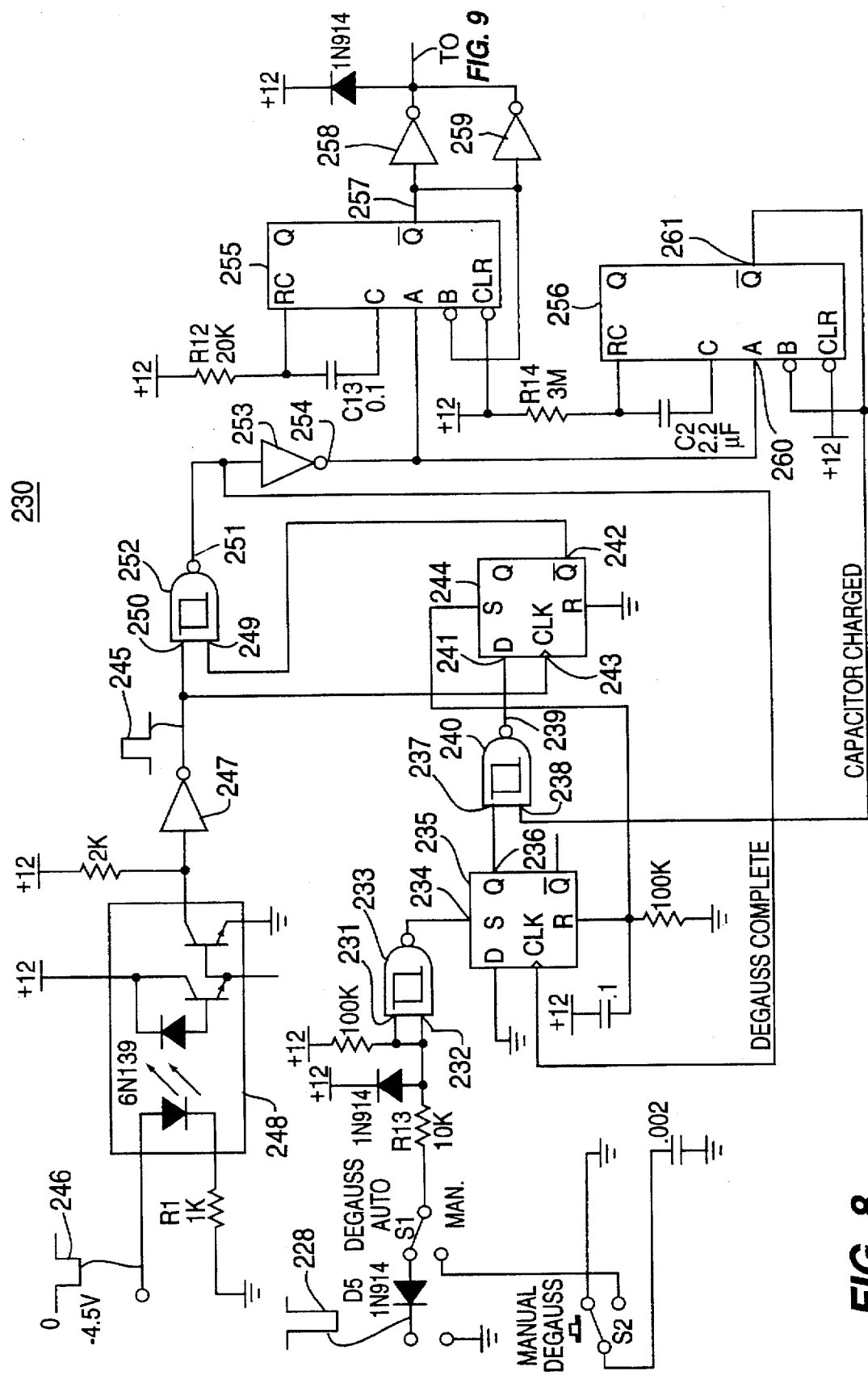

Resistor R6 of breakdown detection circuit 220 couples pulse 228 to a degauss control circuit 230, which is shown in FIG. 8. Switches S1 and S2 of FIG. 8 provide a manual degaussing capability for degauss control circuit 230. The switch positions indicated in FIG. 8 enable automatic degaussing.

Referring to FIG. 8, negative-going pulse 228 is coupled to inputs 231 and 232 of a NAND gate 233 by diode D5 and resistor R13. The NAND gates used throughout degauss control circuit 230 may have an industry part number CD4093B.

Accordingly, the output of the NAND gate 233 is a logic HIGH, which is applied to a SET input 234 of a D-type flip-flop 235, which may have an industry part number CD4013B. With a logic HIGH on input 234, the non-inverting output 236 of flip-flop 235 is also a logic HIGH.

Output 236 is coupled to an input 237 of a NAND gate 240. Another input 238 of NAND gate 240 typically is a logic HIGH during routine operation of focus mask 100, as will be explained more fully in a subsequent portion of this description. The output 239 of NAND gate 240 thus is a logic LOW, the presence of which indicates that a breakdown event has occurred. This logic LOW is coupled to the data input 241 of D-type flip-flop 244.

The complement of the logic LOW at data input 241 will be transferred to an inverting output 242 of flip-flop 244 upon a positive-going transition of a triggering pulse at clock input 243. In the presently preferred embodiment of degauss control circuit 230, a triggering pulse 245 is advantageously derived from a vertical blanking pulse 246 of a video display apparatus so that the degaussing operation is deferred until the next vertical blanking period after detection of the breakdown event. This enables correction of the discoloration band anomaly without disturbing the viewer of the video display apparatus. Of course, an artisan of ordinary skill could appropriately modify, or even eliminate, degauss control circuit 230 to effect degaussing immediately upon detection of a breakdown event.

During a vertical retrace period, the vertical blanking pulse 246 illustratively drops to a voltage level that is approximately 4.5 volts below a reference potential, for example ground. The vertical blanking pulse 246 may be coupled to an inverting buffer 247 by an opto-isolator 248, or by any other means which suitably isolates a vertical deflection circuit from the degauss control circuit 230. The inverting buffer 247 provides the positive-going triggering pulse 245, which may have a peak-to-peak value of approximately 12 V and may have a pulse width equal to approximately the vertical blanking period, or approximately 1 msec.

Once triggering pulse 245 is applied to the clock input 243 of flip-flop 244, a logic HIGH appears at the inverting output 242 and is coupled to an input 249 of a NAND gate 252. Triggering pulse 245 is provided at another input 250 of NAND gate 252. The resulting logic LOW at output 251 is inverted by an inverting buffer 253, and the resulting transition to a logic HIGH at output 254 of buffer 253 triggers monostable multivibrator 255, which is connected in a non-retriggerable configuration.

When multivibrator 255 is triggered by buffer 253, an inverting output 257 goes to a logic LOW, which is inverted by inverting buffers 258 and 259 to provide a logic HIGH. The duration of this logic HIGH is set by an appropriate choice of resistor R12 and capacitor C13. In a presently preferred embodiment, the duration of this logic HIGH is equal to approximately the vertical blanking period, or approximately 1 msec. The outputs of buffers 258 and 259 are coupled to the voltage divider formed by resistors R7 and R8 of the degauss circuit 270, which is shown in FIG. 9.

Figure 10:
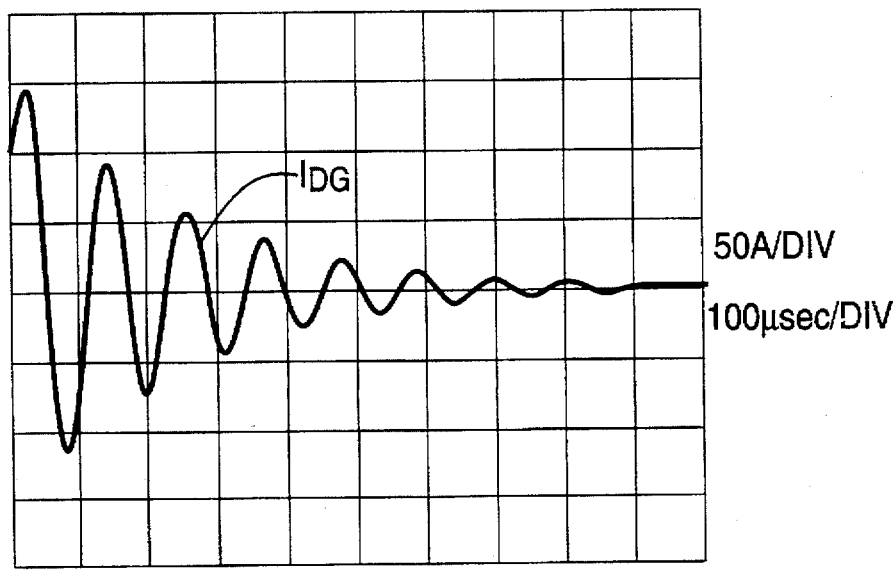
FIG. 10 is useful for explaining operation of the degaussing circuit of FIG. 9.
Figure 9:
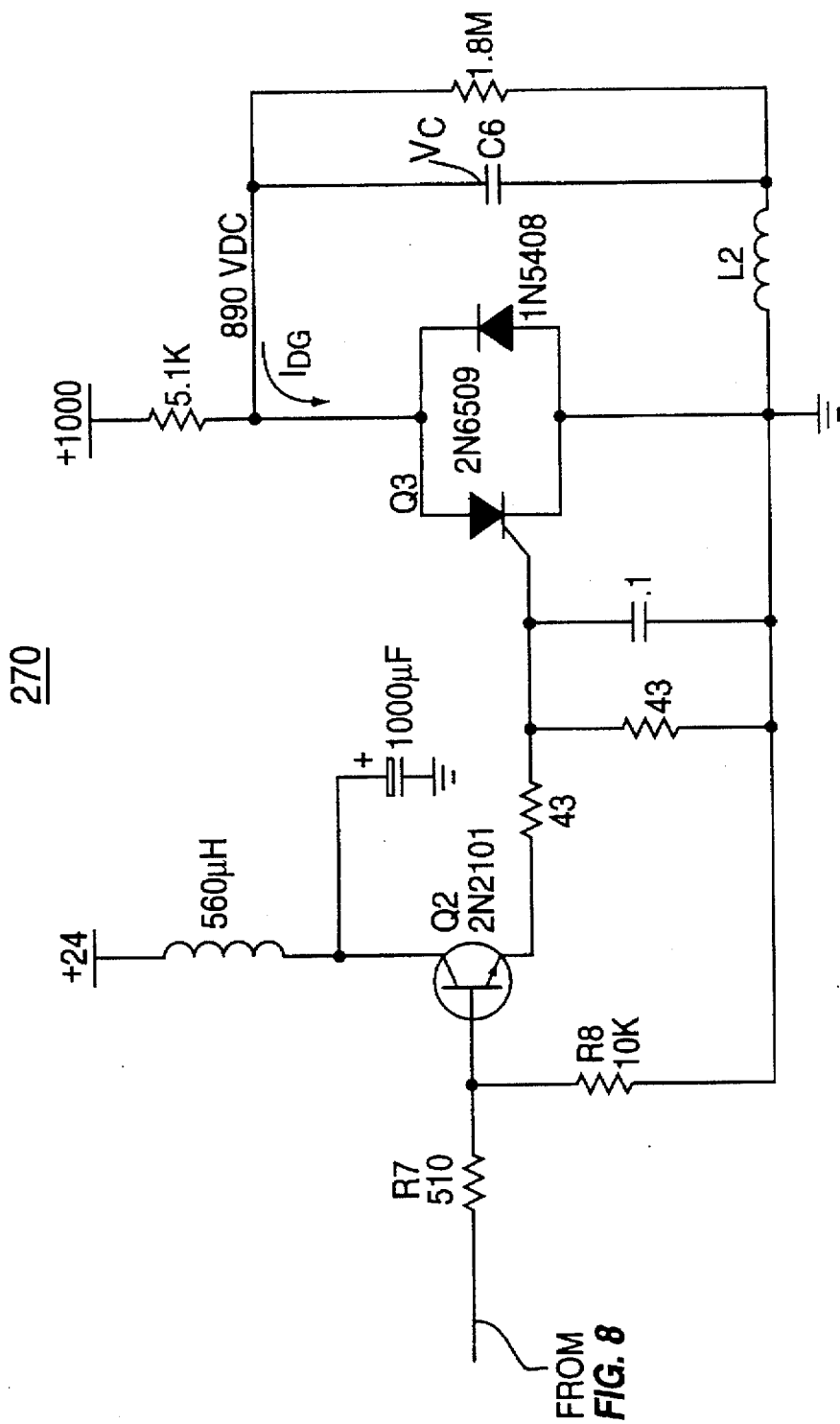
FIG. 9 shows a prior-art resonant degaussing circuit.

Referring to FIG. 9, application of the logic HIGH at the outputs of buffers 258 and 259 to the voltage divider R7, R8 causes transistor Q2 to begin conducting, or turn ON. A voltage of 24 V thus triggers the gate electrode of thyristor Q3 and, consequently, a degaussing current $I_{DG}$ flows between resonant inductor L2 and resonant capacitor C6 in a damped oscillatory manner, as shown in FIG. 10, to demagnetize the focus-mask structure.

Referring now to FIGS. 8 and 9, during routine operation of focus mask 100 resonant capacitor C6 is fully charged to a nominal voltage of, illustratively, 890 V DC, and input 238 of NAND gate 240 has a logic HIGH level. However, during degaussing of the focus mask 100, degaussing current $I_{DG}$ flows through degauss circuit 270 and a voltage $V_C$ across resonant capacitor C6 decreases below the nominal voltage. Once the degaussing operation is completed, the capacitor C6 recharges to its nominal voltage in anticipation of the next degaussing operation.

If a breakdown event is detected, and a degaussing operation thereby attempted, while voltage $V_C$ is below its nominal value, the focus-mask 100 will not be degaussed properly. Such a situation may occur, for example, if a breakdown event is detected while a degaussing operation is already in progress.

Degauss control circuit 230 advantageously provides a capability for deferring a degaussing operation until resonant capacitor C6 is fully charged. Thus, once a degaussing operation is initiated by detection of a breakdown event, a subsequent degaussing operation cannot be initiated, despite the detection of a breakdown event, until the first vertical blanking interval after resonant capacitor C6 is fully charged. A leading-edge triggering input 260 of monostable multivibrator 256 is coupled to the corresponding input of monostable multivibrator 255. Multivibrator 256 is connected in a non-retriggerable configuration. When multivibrator 255 is triggered by the positive-going transition at the output 254 of buffer 253, thus initiating degaussing, multivibrator 256 is likewise triggered and a logic LOW is provided to input 238 of NAND gate 240 by the inverting output 261 of multivibrator 256. A degaussing operation cannot be initiated until output 261 of multivibrator 256 provides a logic HIGH at the input 238 of NAND gate 240. This occurs at a predetermined time after multivibrator 256 is first triggered. The predetermined time interval is set by an appropriate choice of resistor R14 and capacitor C2.

It will be apparent to those skilled in the art that, although the invention has been described in terms of specific examples, modifications and changes may be made to the disclosed embodiments without departing from the essence of the invention. For example, one skilled in the art will recognize that the logic functions performed in breakdown detection circuit 220 and degauss control circuit 230 could be performed by a microprocessor and associated circuitry. It is, therefore, to be understood that the appended claims are intended to cover all modifications which naturally flow from the foregoing treatise and examples.

What is claimed is:

1. An arrangement for eliminating discoloration bands in a cathode ray tube having a focus mask structure, said arrangement comprising:

a breakdown detection circuit for detecting a breakdown event in said focus mask structure; and, a degauss circuit responsive to said breakdown detection circuit for degaussing said focus mask structure.

2. The circuit of claim 1, wherein said degauss circuit has a resonant topology.

3. The circuit of claim 2, wherein said degauss circuit comprises a resonant capacitor, and charging of said capacitor defers said degaussing following detection of said breakdown event.

4. The circuit of claim 1, further comprising:

first switch means for selecting between automatic or manual degaussing of said focus mask structure upon detection of a breakdown event; and, second switch means for initiating manual degaussing.

5. An arrangement for eliminating discoloration bands in a cathode ray tube having a focus mask structure, said arrangement comprising:

a breakdown detection circuit for detecting a breakdown event in said focus mask structure;

a degauss control circuit coupled to said breakdown detection circuit; and, a degauss circuit responsive to said degauss control circuit for degaussing said focus mask structure.

6. The arrangement of claim 5, wherein said breakdown detection circuit triggers said degauss control circuit upon detection of said breakdown event.

7. The arrangement of claim 6, wherein said breakdown detection circuit provides a waveform to said degauss control circuit.

8. The arrangement of claim 7, wherein said waveform has a substantially pulse shape.

9. The arrangement of claim 6, wherein said degauss control circuit defers degaussing until a next subsequently occurring blanking of a screen of said cathode ray tube following detection of said breakdown event.

10. The arrangement of claim 9, wherein said blanking is responsive to a vertical blanking pulse of a video signal applied to said cathode ray tube.

11. The arrangement of claim 5, wherein said degauss control circuit comprises:

means for storing information indicating the occurrence of a breakdown event;

means for coupling a blanking pulse to said arrangement;

means for comparing said information from said storing means with said blanking pulse; and, triggering means responsive to said comparing means.

12. The arrangement of claim 11, wherein said triggering means comprises a monostable multivibrator circuit.

13. The arrangement of claim 12, wherein said multivibrator circuit is configured for a non-retriggerable mode of operation.

14. The arrangement of claim 11, wherein said comparing means enables degaussing during a next subsequently occurring blanking pulse following detection of said breakdown event.

15. The arrangement of claim 14, wherein said blanking pulse is a vertical blanking pulse.

16. An arrangement for eliminating discoloration bands in a cathode ray tube having a focus mask structure, said arrangement comprising:

means for storing information indicating the occurrence of a breakdown event;

means for coupling a blanking pulse to said arrangement;

first means for comparing said information from said storing means with said blanking pulse;

triggering means responsive to said comparing means;

means for generating a pulse waveform responsive to said first means;

second means for comparing said information from said storing means with said pulse waveform; and a degaussing circuit responsive to said triggering means for degaussing said focus mask structure.

17. The arrangement of claim 16, wherein said second means defers degaussing of said focus mask structure during a duration of said pulse waveform.

18. The arrangement of claim 16, wherein said generating means comprises a monostable multivibrator circuit.

19. The arrangement of claim 18, wherein said multivibrator circuit is configured for a non-retriggerable mode of operation.

* * * * *